(12) United States Patent
Wobben

(10) Patent No.: US 7,374,405 B2
(45) Date of Patent: May 20, 2008

(54) APPARATUS AND METHODS FOR HANDLING ROTOR BLADES

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/517,133

(22) PCT Filed: Jun. 4, 2003

(86) PCT No.: PCT/EP03/05811

§ 371 (c)(1),
(2), (4) Date: Jun. 29, 2005

(87) PCT Pub. No.: WO03/104645

PCT Pub. Date: Dec. 18, 2003

(65) Prior Publication Data

US 2005/0258064 A1 Nov. 24, 2005

(30) Foreign Application Priority Data

Jun. 6, 2002 (DE) ................................ 102 25 025

(51) Int. Cl.
*F03D 1/00* (2006.01)
(52) U.S. Cl. ................................... 416/244 R
(58) Field of Classification Search ................ 416/1, 416/63, 146 R, 248
See application file for complete search history.

(56) References Cited

U.S. PATENT DOCUMENTS

| | | | |
|---|---|---|---|
| 2,674,370 A | 4/1954 | Iredell, III | 206/46 |
| 3,157,424 A | 11/1964 | Hall | 294/67 |
| 3,173,556 A | 3/1965 | Gaudriot et al. | 234/8 |
| 3,861,531 A | 1/1975 | Bellati | 206/523 |
| 3,966,075 A | 6/1976 | Schultz | 220/1.5 |
| 3,997,210 A | 12/1976 | Jay | 294/81 R |
| 4,191,415 A | 3/1980 | Frei | 294/67 R |
| 4,350,254 A * | 9/1982 | Noly | 212/279 |
| 4,526,278 A | 7/1985 | Hebert | 212/242 |
| 5,397,000 A * | 3/1995 | Holte et al. | 206/545 |
| 5,628,403 A | 5/1997 | Thomas et al. | 206/523 |
| 5,953,928 A * | 9/1999 | Saia et al. | 62/239 |
| 6,276,888 B1* | 8/2001 | Rubio | 414/406 |
| 6,983,844 B2* | 1/2006 | O'Kane et al. | 206/443 |
| 2003/0175089 A1* | 9/2003 | Almind | 410/2 |

FOREIGN PATENT DOCUMENTS

| | | |
|---|---|---|
| CA | 2341398 A1 | 3/2000 |
| DE | 298 19 391 U1 | 2/1999 |
| DE | 198 48 533 A1 | 4/2000 |
| DE | 201 09 835 U1 | 1/2002 |
| EP | 0 933 309 A2 | 8/1999 |
| GB | 1146193 | 3/1969 |
| WO | WO 02/083523 A1 | 10/2002 |

* cited by examiner

*Primary Examiner*—Edward K. Look
*Assistant Examiner*—Nathan Wiehe
(74) *Attorney, Agent, or Firm*—Seed IP Law Group PLLC

(57) ABSTRACT

An apparatus for handling rotor blades of wind power installations. An apparatus for simplified handling of rotor blades is afforded by a carrier element and at least one rotor blade receiving means fixedly connected thereto. A rotor blade is received in the apparatus during a blade fitting procedure. The apparatus may reduce the effect of the wind and the effect of mass inertia on during the blade fitting procedure.

19 Claims, 2 Drawing Sheets

APPARATUS AND METHODS FOR HANDLING ROTOR BLADES

BACKGROUND OF THE INVENTION

1. Field of the Invention

This disclosure concerns an apparatus for handling rotor blades of wind power installations.

2. Description of the Related Art

For the assembly of wind power installations inter alia the rotor hub and the rotor blades are generally transported to the building site individually, because of their considerable dimensions. At the site they are then assembled to form a rotor unit.

Various assembly procedures are considered for that purpose. In one procedure the rotor blades are mounted to the rotor hub on the ground and the entire rotor unit is then conveyed into the assembly position and fitted there, by a crane.

In another procedure the rotor hub is firstly mounted to the head of the wind power installation. Thereafter the rotor blades are lifted individually to the rotor hub and there assembled in situ.

In both cases however it is necessary to handle the large rotor blades weighing several tons, move them precisely into the respective installation situation and hold them there.

That is implemented by a crane which lifts the rotor blade with straps (or chains), moves it into its installation situation and holds it there. For that purpose the straps are laid around the rotor blade at predetermined positions. The rotor blade is then lifted and transported.

BRIEF SUMMARY OF THE INVENTION

In one aspect, an embodiment provides an apparatus for the simplified handling of a rotor blade.

In another aspect, an embodiment comprises a rigid carrier element with at least one rotor blade receiving means fixedly connected thereto.

In that respect, the effect of wind during the blade-fitting procedure on the one hand and the effect of mass inertia on the other hand are reduced.

In another embodiment, a ball rotary joint arranged on the carrier element permits a rotary movement of the apparatus with the rotor blade in a defined rotary plane. In order to facilitate such a rotary movement by machine, a rotary mechanism drive can be provided at the ball rotary joint.

In another embodiment, eyes can be provided at mutual spacings for various tasks, such as for example fixing securing cables and/or guide cables. Guide cables make it possible to provide manually for example for orientation of the rotor blade in the event of failure of or in place of the rotary mechanism drive, from the ground.

In order to provide a particularly simple receiving configuration for the rotor blades, the rotor blade receiving means in one embodiment can be in the form of a frame which encloses the rotor blade at at least three sides.

In another embodiment, a locking member is mounted pivotably at one side of the rotor blade receiving means. That locking member permits the rotor blade receiving means to be closed at the fourth side so that the rotor blade is reliably prevented from unintentionally sliding out of the rotor blade receiving means.

In another embodiment, the rotor blade is held securely in the rotor blade receiving means, in one embodiment the rotor blade receiving means embraces the rotor blade in positively locking relationship.

In another embodiment the rotor blade receiving means is of such a configuration that cushions are provided between the rotor blade receiving means and the rotor blade in order to avoid damage to the rotor blade.

In one embodiment those cushions are inflatable. In that way the rotor blade can be accommodated in the rotor blade receiving means when the cushions are initially uninflated. As soon as the rotor blade is in the predetermined position the cushions are inflated with a predeterminable pressure. In that way on the one hand the rotor blade is fixed in the desired position while on the other hand damage to the rotor blade is prevented.

In order to facilitate transport of a rotor blade with the apparatus according to one embodiment, the apparatus is of such a further configuration that there are provided valves for filling and/or emptying the inflatable cushions. There may also be provided an energy storage means and/or a pressure storage means and/or at least one plug connector for the connection of an electric and/or hydraulic and/or pneumatic line. That configuration of the apparatus according to one embodiment means that the inflatable cushions as well as the energy storage means and the pressure storage means can be filled. They can then be separated from the lines and permit the apparatus to be transported with the rotor blade, in which case any pressure losses which may occur in the cushions can be compensated by the storage means. The energy storage means, for example a capacitor of suitable size or a chemical storage means such as an accumulator provide in that situation the required energy for a control system and for the actuation of suitable control devices such as valves. It will be appreciated that in that respect suitable sensors may also be included.

In an alternative embodiment of the invention the apparatus includes at least one carrier bar and a carrier plate, wherein the carrier bar engages through a through opening provided in the rotor blade and ends at the carrier plate. That arrangement provides that the carrier plate forms the contact surface for the rotor blade and can be of a suitably large dimension and suitably cushioned. The carrier bar extends through the rotor blade and thus makes a fixed connection between the carrier device and the rotor blade.

BRIEF DESCRIPTION OF THE SEVERAL VIEWS OF THE DRAWINGS

Embodiments of the invention are described in greater detail hereinafter with reference to the figures in which.

DETAILED DESCRIPTION OF THE INVENTION

Figure 1:
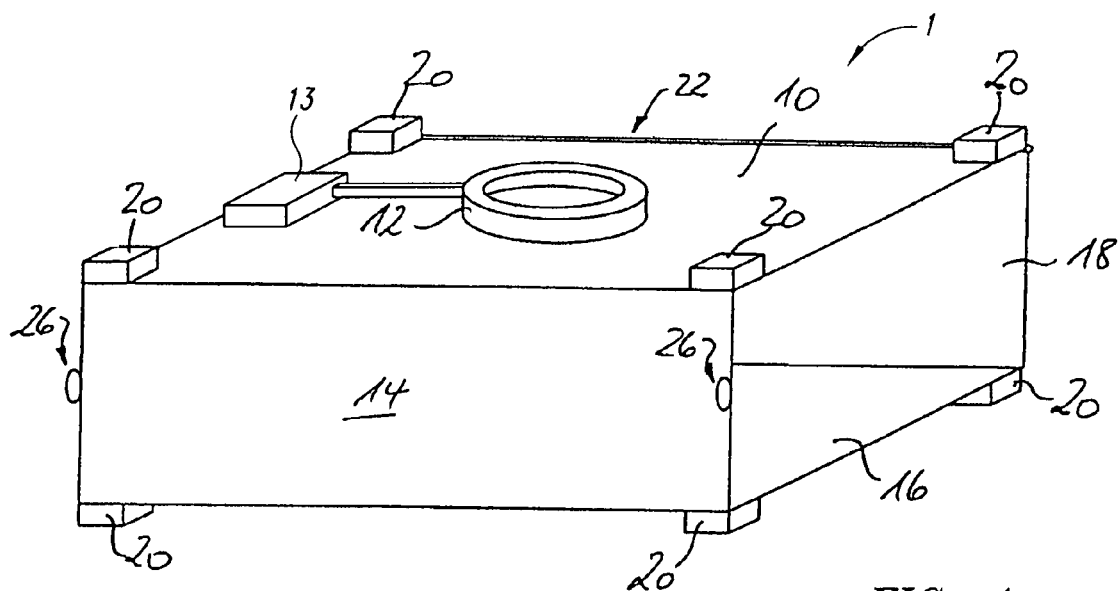
FIG. 1 shows a front, left, isometric view of an apparatus for handling a rotor blade according to a first illustrated embodiment of the invention.

A carrier element 10 is provided in FIG. 1. That carrier element 10 as illustrated is of a rectangular shape. Provided at the center of that carrier element 10 is a ball rotary joint 12. Even when the apparatus is suspended rigidly, for example by being bolted to the roller head of a crane, that ball rotary joint permits a rotary movement of the entire apparatus about the vertical axis.

Provided opposite the carrier element 10 is a bottom element 16. The bottom element 16 is of substantially the same dimensions and shape as the carrier element 10. A side element 14 is provided between the carrier element 10 and the bottom element 16. Eyes 26 are shown on that side element 14. Cables can be passed through the eyes 26, which for example permit the entire apparatus to be rotated about its vertical axis, even when it has already been lifted by a crane.

The arrangement of the carrier element 10, the bottom element 16 and the side element 14 affords an open apparatus 1 which receives the rotor blade. So that the apparatus 1 encloses the rotor blade at four sides, there can be a further side element 18. That second side element 18 is however mounted pivotably by a hinge 22 to the carrier element 10. Therefore, the pivotal movement of that second side element 18 can open an opening through which the rotor blade can be received by or released from the apparatus 1.

So-called container corners 20 are also shown at predetermined positions of the carrier element 10 and the bottom element 16. Those container corners 20 permit the apparatus 1 to be connected on the one hand to further apparatuses of the same configuration and also for example during transport of a rotor blade to the transport vehicle, in a simple manner.

Just as for actuation of the second side element 18, a respective suitable rotary mechanism drive 13 can also be provided for actuation of the ball rotary joint 12. It will be appreciated that, in the case of the ball rotary joint 12, that can be a drive motor while for example electrical, hydraulic or pneumatic devices can be used for actuation of the second side element 18.

Figure 2:
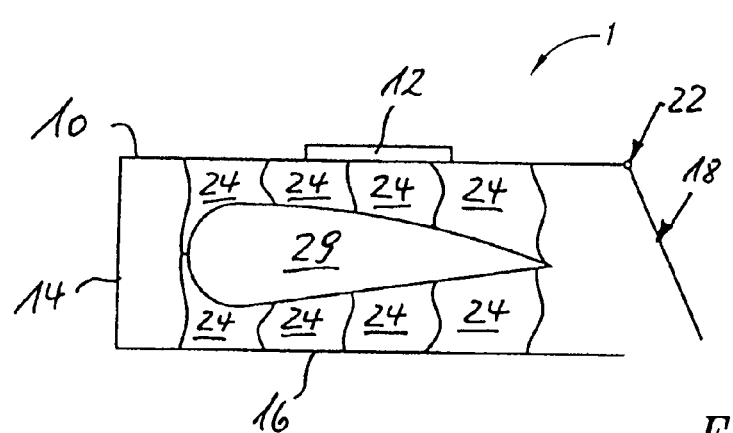
FIG. 2 shows a cross-sectional view of the apparatus of FIG. 1.

FIG. 2 shows a side view of an apparatus 1 according to an embodiment of the invention with a rotor blade 29. Provided in this Figure within the apparatus according to the invention which is formed by the carrier element 10, the bottom plate 16, the first side wall 14 and the second side wall 18 which is mounted pivotably to the carrier element 10, are cushions 24 which on the one hand securely hold the rotor blade 29 in its predetermined position and on the other hand protect it from damage by the apparatus.

Those cushions 24 can be inflatable (with gas or liquid). In that way it is possible without any problem for the rotor blade 29 to be received by or released from the apparatus 1 and the rotor blade 29 can nonetheless be held in a simple fashion. In that respect the cushions 24 can be inflated to a first pressure at which the rotor blade 29 can be held in a substantially secure manner without causing damage to the rotor blade 29.

Figure 3:
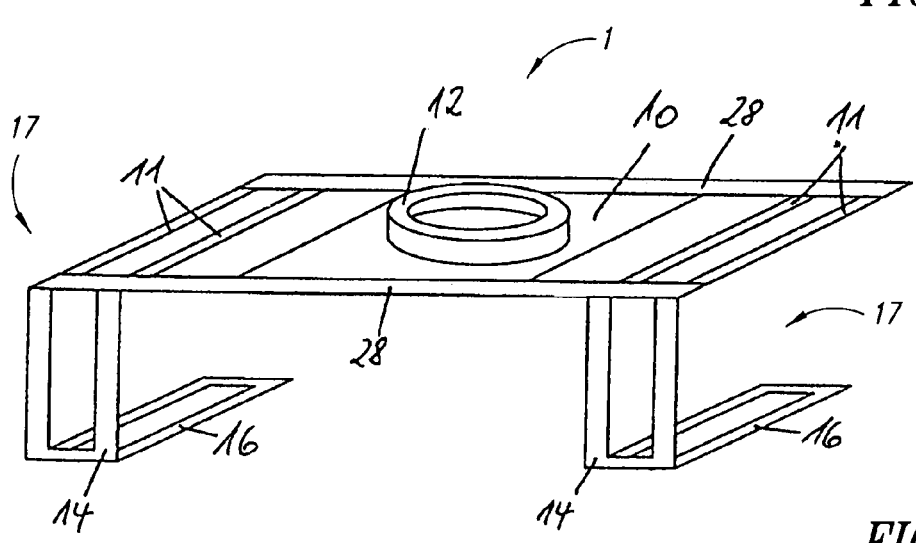
FIG. 3 shows a front, left, isometric view of an apparatus for handling a rotor blade according to a second illustrated embodiment of the invention.

FIG. 3 shows an alternative embodiment of the apparatus 1 according to the invention. In this embodiment, the carrier element 10 can be smaller but it again has a ball rotary joint 12. It will be appreciated that a suitable drive can be provided at the ball rotary joint 12.

Longitudinal bearers 28 are arranged at two opposite sides of the carrier element 10. Mounted to those longitudinal bearers 28 once again at two opposite sides of the carrier element 10 is a rotor blade receiving means 17 comprising upper elements 11, side elements 14 and bottom elements 16. Here the rotor blade receiving means 17 is shown as being open at one side. It will be appreciated that it is also possible to provide there a pivotably mounted element which permits the rotor blade receiving means 17 to be closed at the open side so that a rotor blade (see rotor blade 29 of FIG. 2) accommodated therein is again enclosed at all four sides. For the sake of clarity, also the container corners (see reference 20 in FIG. 1) and the eyes (see reference 26 in FIG. 1) are not shown in the illustrated embodiment. One skilled in the art will appreciate and understand that features described in one embodiment may be included in other embodiments.

This alternative embodiment of the apparatus according to the invention can weigh less and yet still have adequate strength.

Figure 4:
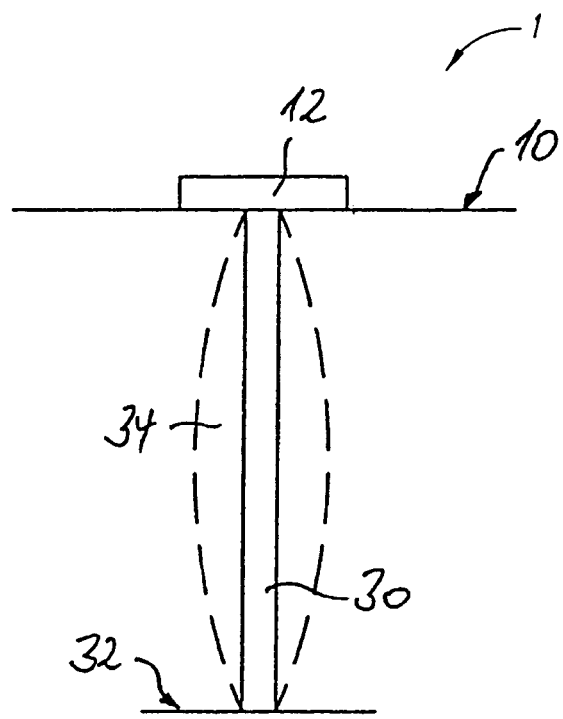
FIG. 4 shows a cross-sectional view of an apparatus for handling a rotor blade having a carrier bar according to another illustrated embodiment of the invention.

FIG. 4 shows a further embodiment of an apparatus 1 according to the invention. This apparatus can be used to particular advantage in relation to rotor blades which have a through hole between the top side and the underside (that is to say the reduced-pressure side and the increased-pressure side in the case of rotor blades which act on the basis of the lift principle). In this embodiment the ball rotary joint 12 is again provided on the carrier element 10. Adjoining the carrier element 10 is a carrier bar 30 which is fixedly connected to the carrier element 10. A carrier plate 32 is provided at the end of the carrier bar 30, which is in opposite relationship to the carrier element 10. The carrier plate 32 is secured releasably to the carrier bar 30; the carrier bar 30 can therefore be passed through the through hole in the rotor blade, after removal of the carrier plate 32. Subsequently the carrier plate 32 is fixed to the end of the carrier bar 30 and thus clamps the rotor blade (not shown) in position.

As the carrier bar 30 can be passed in a particularly simple fashion through the through hole in the rotor blade (not shown) when a clearance fit is involved, but such clearance is unwanted during the transport operation, it is possible to provide on the carrier bar a variable portion 34, such as for example an inflatable bellows, which fills up the intermediate space between the carrier bar 30 and the rotor blade (not shown) and thus substantially eliminates relative movement between the carrier bar 30 and the rotor blade.

Figure 5:
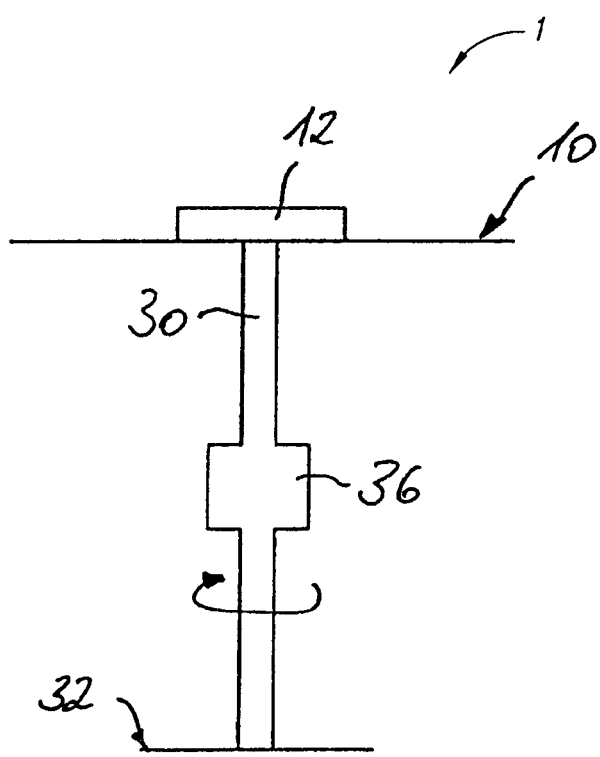
FIG. 5 shows a cross-sectional view of an apparatus for handling a rotor blade having a rotatable carrier bar according to yet another illustrated embodiment of the invention.

FIG. 5 shows a further embodiment of an apparatus 1 according to the invention. That apparatus 1 again has a carrier element 10 with a ball rotary joint 12. In addition a carrier bar 30 is once again mounted to the carrier element 10 while the carrier plate 32 is again disposed at the opposite end thereof. It will be noted that, in this embodiment, the carrier bar 30 is connected to the carrier element 10 rotatably about the longitudinal axis of the carrier bar 30. In a central portion the carrier bar 30 also has a locking member 36.

One skilled in the art will appreciate and understand that there can be many different possible options in regard to the configuration of the locking member 36. For example, one option is a fixed locking member which, after insertion into the rotor blade, is rotated together with the carrier bar 30 so that it engages into a corresponding opening provided within the rotor blade, and thus forms a releasable but firm connection to the rotor blade.

It will be appreciated that alternatively it is also possible to provide movable elements which are moved in situ into a locking position in order to form the connection between the rotor blade and the apparatus.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An apparatus for handling rotor blades of wind power installations, the apparatus comprising:
a carrier element connected with at least one rotor blade receiving means, wherein the rotor blade receiving means includes a carrier frame configured to enclose at least one rotor blade about at least three sides upon handling and at least one carrier bar extending perpendicularly with respect to the carrier element, a cross-section of the carrier bar being variable over at least one region.

2. The apparatus according to claim 1, further comprising:
a ball rotary joint arranged on the carrier element; and
a rotary mechanism drive at the ball rotary joint.

3. The apparatus according to claim 1, further comprising a plurality of eyes mutually spaced in a longitudinal direction of the carrier element for receiving cables.

4. The apparatus according to claim 1 wherein the carrier frame is configured to enclose the at least one rotor blade about four sides upon handling.

5. The apparatus according to claim 1, further comprising a locking member mounted pivotably at one side of the rotor blade receiving means.

6. The apparatus according to claim 1 wherein the rotor blade receiving means is configured to engage the at least one rotor blade in a complementary locking relationship.

7. The apparatus according to claim 1, further comprising a plurality of cushions provided throughout the rotor blade receiving means.

8. The apparatus according to claim 7 wherein the cushions are inflatable.

9. The apparatus according to claim 7 wherein the cushions include valves for inflating/deflating the cushions.

10. The apparatus according to claim 1, further comprising at least one of an energy storage means, and/or pressure storage means, and/or a plug connector to connect one of an electrical, and/or hydraulic, and/or pneumatic line, wherein the energy storage means, pressure storage means, or plug connector is used to maintain a first pressure in a plurality of cushions located in the rotor blade receiving means.

11. The apparatus according to claim 1, further comprising: a carrier plate releasably fixed to the at least one carrier bar.

12. The apparatus according to claim 1, further comprising: a device for bolting the apparatus to a roller head of a crane.

13. The apparatus according to claim 1, further comprising a plurality of container corners positioned on at least one of either the top side and/or the underside of the apparatus.

14. The apparatus according to claim 1 wherein the carrier element is rigid.

15. A method for securing and handling at least one rotor blade, the method comprising:
placing the at least one rotor blade into a carrier element that is configured to reduce an effect of the wind on the at least one rotor blade, a receiving means of the carrier element surrounding the at least one rotor blade on at least three sides;
protecting the at least one rotor blade against damage associated with a contact of the at least one rotor blade with the carrier element wherein protecting the at least one rotor blade includes extending a carrier bar of the receiving means perpendicularly with respect to the carrier element and varying a cross-section of the carrier bar over at least one region; and
handling the carrier element and the at least one rotor blade via a ball rotary joint mounted on the carrier element.

16. The method of claim 15, further comprising:
maneuvering the carrier element toward a wind power installation.

17. The method of claim 15, further comprising:
opening the carrier element to release the at least one rotor blade.

18. The method of claim 15 wherein protecting the at least one rotor blade further includes inflating cushions located in the carrier element and substantially around the at least one rotor blade.

19. An apparatus for handling rotor blades of wind power installations, the apparatus comprising:
a carrier element connected with at least one rotor blade receiving means, wherein the rotor blade receiving means includes a carrier frame configured to enclose at least one rotor blade about at least three sides upon handling wherein the rotor blade receiving means includes at least one carrier bar extending perpendicularly with respect to the carrier element, a cross-section of the carrier bar being variable over at least one region.

* * * * *